Figure 1:
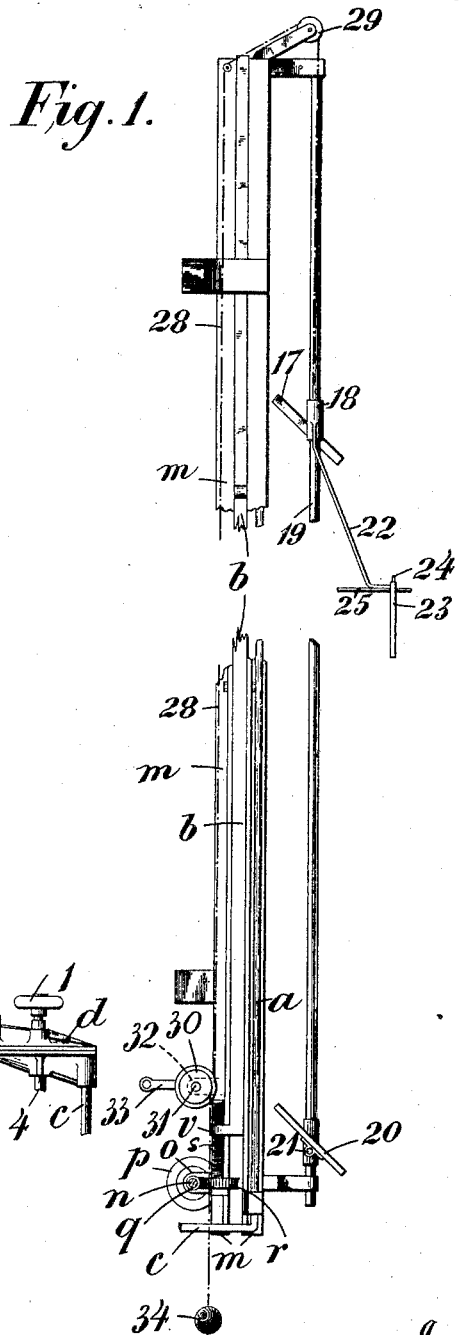

No. 780,336. PATENTED JAN. 17, 1905.
R. T. GLASCODINE.
APPARATUS FOR INDICATING PRESSURE OR TEMPERATURE, OR BOTH, OF SATURATED STEAM.
APPLICATION FILED APR. 25, 1903.

5 SHEETS—SHEET 1.

No. 780,336. PATENTED JAN. 17, 1905.
R. T. GLASCODINE.
APPARATUS FOR INDICATING PRESSURE OR TEMPERATURE, OR BOTH,
OF SATURATED STEAM.
APPLICATION FILED APR. 25, 1903.
5 SHEETS—SHEET 2.
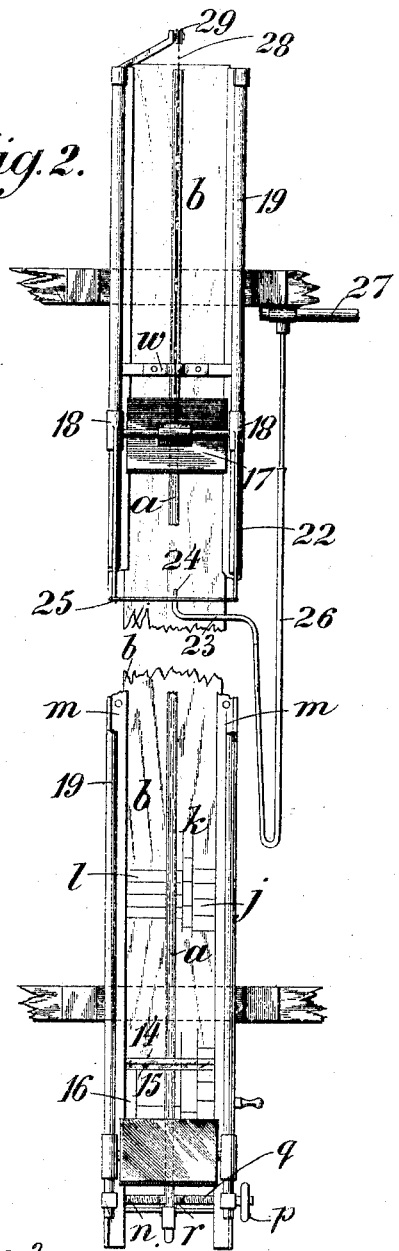
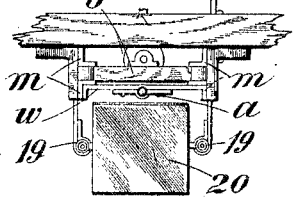

No. 780,336. PATENTED JAN. 17, 1905.
R. T. GLASCODINE.
APPARATUS FOR INDICATING PRESSURE OR TEMPERATURE, OR BOTH, OF SATURATED STEAM.
APPLICATION FILED APR. 25, 1903.

5 SHEETS—SHEET 3.

Witnesses:
Chas. R. Wright, Jr.
Alice H. Hoffman

Inventor:
R. T. Glascodine
By A. S. Pattison,
Atty.

No. 780,336. PATENTED JAN. 17, 1905.
R. T. GLASCODINE.
APPARATUS FOR INDICATING PRESSURE OR TEMPERATURE, OR BOTH, OF SATURATED STEAM.
APPLICATION FILED APR. 25, 1903.

5 SHEETS—SHEET 4.

No. 780,336. PATENTED JAN. 17, 1905.
R. T. GLASCODINE.
APPARATUS FOR INDICATING PRESSURE OR TEMPERATURE, OR BOTH,
OF SATURATED STEAM.
APPLICATION FILED APR. 25, 1903.

5 SHEETS—SHEET 5.

Witnesses.
Chas. R. Wright Jr.
Alice W. Hoffman

Inventor
R. T. Glascodine
By A. S. Pattison,
atty

No. 780,336. Patented January 17, 1905.

UNITED STATES PATENT OFFICE.

RICHARD THOMSON GLASCODINE, OF LONDON, ENGLAND.

APPARATUS FOR INDICATING PRESSURE OR TEMPERATURE, OR BOTH, OF SATURATED STEAM.

SPECIFICATION forming part of Letters Patent No. 780,336, dated January 17, 1905.

Application filed April 25, 1903. Serial No. 154,296.

*To all whom it may concern:*

Be it known that I, RICHARD THOMSON GLASCODINE, a subject of the King of Great Britain and Ireland, residing at London, England, have invented Improvements in or Connected with Apparatus for Indicating Pressure or Temperature, or Both, of Saturated Steam, of which the following is a specification.

This invention has reference to apparatus for indicating pressure of steam or the temperature of steam by means of its pressure, or both, of the kind comprising an upwardly-extending transparent tube that is open at its upper end to the atmosphere, a suitably-calibrated scale against which said tube is supported, and a mercury-containing vessel, the lower part of which is in communication with the lower end of said tube and to the upper part of which the steam is admitted.

For the purpose of preventing the transmission of heat to the mercury the steam may be caused to act on the mercury through a head of water contained in either the mercury vessel or one or more other communicating vessels. To enable the indications to be read without difficulty, there is provided a mirror or mirrors capable of adjustment in relation to the tube, so as to reflect the readings of the apparatus conveniently for observation, and in combination with such mirror or mirrors artificial light may be employed. Moreover, in order that the surface of the mercury in the tube may not become coated with dross and the sharpness of the reading thus impaired it is covered by a layer of glycerin or the like.

To enable a correct indication to be obtained, means are provided whereby the scale of the apparatus may be conveniently adjusted according to barometric pressure, and to make such adjustment possible when the apparatus is in use a device, such as a fixed glass plate provided with a hair-line, is arranged in proximity to the scale and so that the hair-line is in line with the normal level of the mercury in the tube. By adjusting the scale so that the hair-line on the fixed plate is in line with the mark on the scale indicating pressure corresponding to the barometric pressure at the time being the level of mercury in the tube will give the desired correct indication.

Figure 4:
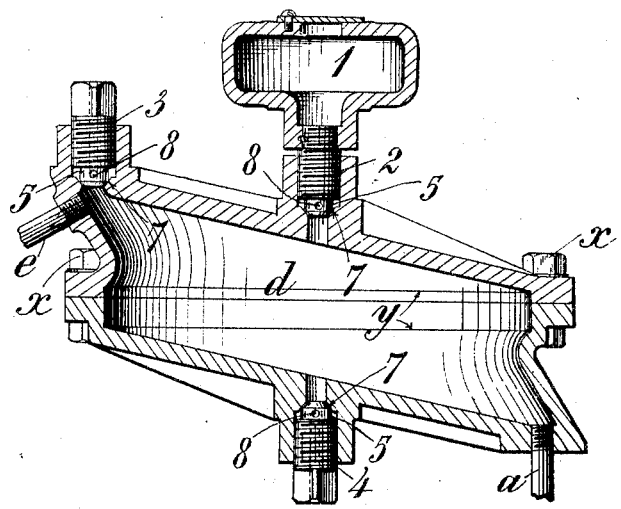
Figure 5:
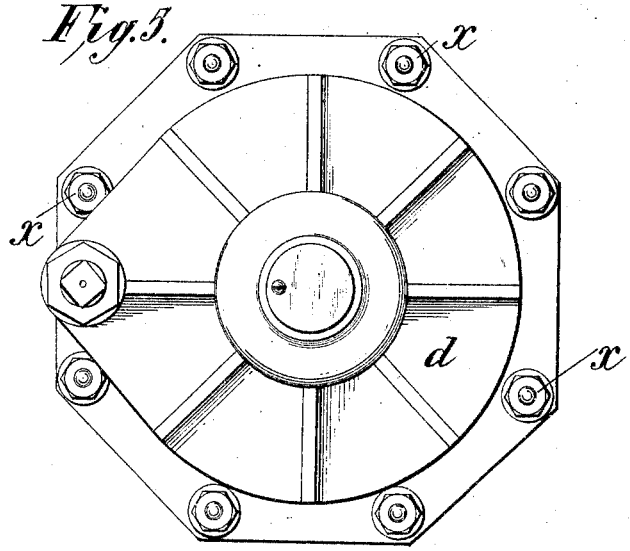
Figure 6:
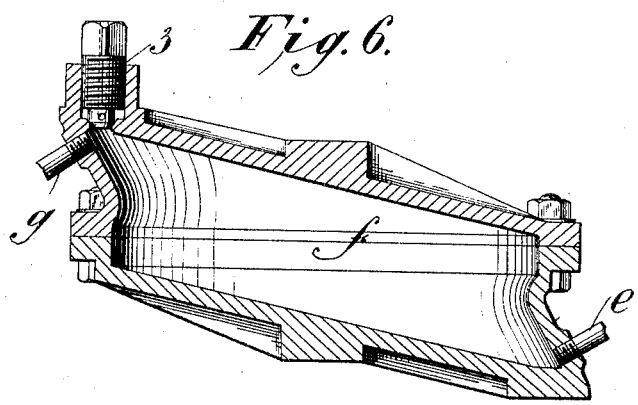
Figure 7:
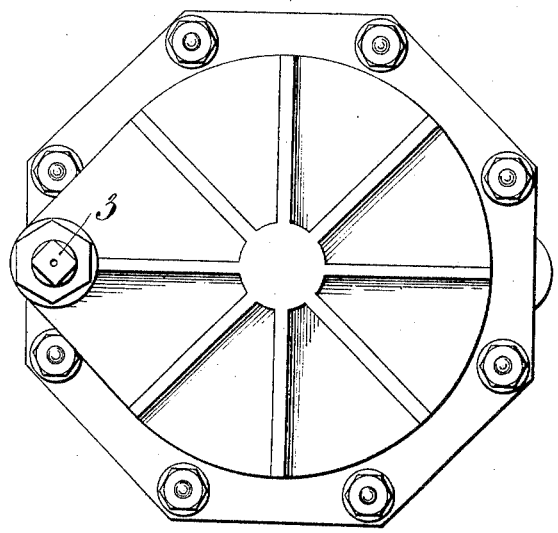

Figure 1 of the accompanying illustrative drawings shows in side elevation an arrangement of indicating apparatus embodying my several improvements. Figs. 2 and 3 show the same, respectively, in front elevation and plan. Figs. 4 and 5 show the mercury-containing vessel of the apparatus, respectively, in central vertical section and in plan. Figs. 6 and 7 are similar views to Figs. 4 and 5, respectively, showing the water-containing vessel of the apparatus; and Figs. 8 and 9, which are also similar views to Figs. 4 and 5, respectively, show the steam vessel of the apparatus.

$a$ is a glass tube that contains mercury and is arranged vertically on a back board $b$. Its upper end is open to the atmosphere, and its lower end is in communication, through a pipe $c$, with the bottom of a mercury-containing vessel $d$, whose top is in communication, through a pipe $e$, with the bottom of a water-containing vessel $f$. The top of this water vessel is in communication, through a pipe $g$, with the bottom of a vessel $h$, hereinafter called the "steam" vessel, adapted to contain water up to a level above that of the water and mercury vessels $d$ and $f$, and whose upper part is in communication with steam the temperature of which is to be indicated.

The pipe $g$ is of approximately U form, and the pipe $e$ inclines upwardly, so that accumulation or trapping of air is prevented.

The back board $b$ is provided with a scale calibrated to indicate at $j$ height in inches, at $k$ corresponding pressure in pounds per square inch, and at $l$ temperature in degrees Fahrenheit corresponding to such pressure. To admit of the scale being adjusted when required according to the variations of barometric pressure, the back board $b$ is mounted to be slid in vertical guides $m$ by a worm-spindle $n$, mounted in bearings $o$ and provided with a hand-wheel $p$ and with a worm $q$, that gears with a worm-wheel $r$ on a screwed spindle $s$, that is prevented from moving longitudinally and works through a nut $v$, fixed to the lower end of the back board $b$.

The mercury-tube $a$, which may conveniently be made in suitable lengths jointed by india-rubber ferrules wired thereon, is supported in brackets $w$, that are fixed to the guides $m$.

The mercury vessel $d$, Figs. 4 and 5, which is made in two parts, suitably flanged and secured together by bolts $x$, is bored cylindrical for such a portion $y$ of its length as to include the highest and lowest level the mercury is likely to assume. Below this cylindrical portion the vessel is made of decreasing cross-sectional area in order to reduce as far as possible the amount of mercury employed. At its upper end this chamber is fitted with a funnel 1, having a screw-threaded spout 2, for supplying mercury to the chamber $d$, and with a hollow plug 3, through which air may be allowed to escape. At its lower end there is fitted another hollow plug, 4, through which mercury may be withdrawn. The inner ends of both plugs 3 and 4 and also of the spout 2 are each formed with a portion, 5, of reduced diameter, having a chamfered valve-like lower edge adapted to make an air-tight joint with a seat 7 and lateral openings 8 above the said chamfered edge thereof and communicating with the interiors thereof. The arrangement is such that to allow mercury from the funnel 1 to enter the chamber $d$ or to leave the chamber through the lower plug 4 or to allow air to escape through the upper plug 3 the funnel or respective plug must be partially unscrewed. The upper part of the vessel may decrease in cross-sectional area toward the air-plug 3, so as to avoid horizontal surfaces from which it would be difficult to dislodge air.

The water-chamber $f$, Figs. 6 and 7, is similar in construction and shape to the mercury-chamber $d$, but without the funnel 1 and lower discharge-plug 4.

Figure 8:
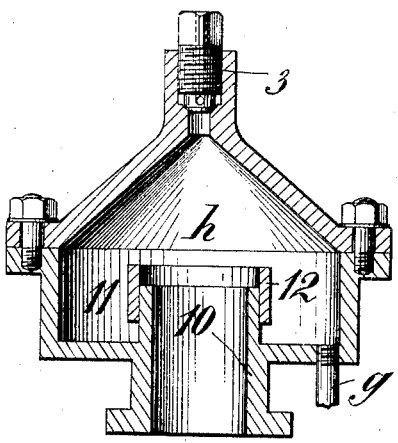
Figure 9:
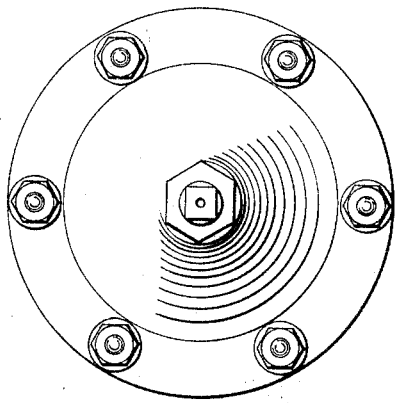

The steam vessel $h$, Figs. 8 and 9, which is made in two parts, suitably flanged and secured together by studs 9, comprises an upper steam space or dome and a lower cylindrical portion formed with a central tubular extension 10, that communicates with the space the temperature of the steam in which it is desired to indicate. Between the extension 10 and the surrounding wall of the vessel $h$ is an annular space 11 with which the pipe $g$ communicates and which forms a kind of weir and determines the height of water contained in the annular space 11. Preferably the extension 10 is provided with a tightly-fitting ring 12, by raising or lowering which the height of water may be varied as desired. The upper portion of the steam vessel may be of a conical shape, and its apex is furnished with a hollow valve-like plug 3, constructed as before described and adapted when partially unscrewed to allow air to escape.

The relative positions of the vessels and the arrangement of the apparatus is such that, assuming the vessel $d$ to be charged with mercury up to a certain level and water supplied to the steam vessel $h$ until the vessel $d$, vessel $f$, and pipes $e$ and $g$ are filled and the vessel $h$ itself charged with water to the top of its projection 10 12, then if the vessel $h$ be in open communication with the atmosphere the head of water will cause the mercury to rise a definite and invariable height in the mercury-tube. About this level there is secured to the guides $m$ a glass strip 14, marked with a hair-line 15, the position of which is so arranged as to exactly coincide with the height of mercury in the tube. The back board $b$, which adjacent to the glass strip 14, may be provided with a metal plate 16, that forms a portion of the scale, but is more finely calibrated than the remainder and in the same manner as an ordinary barometer-scale. The back board is so adjusted that the hair-line 15 is in line with the scale-indication on the metal plate 16 corresponding to the barometric height at the time being. If saturated steam be then admitted to the vessel $h$, the height of mercury will not vary if such steam be at atmospheric pressure; but if the steam-pressure rises, the mercury will rise exactly in proportion to the increase of pressure and consequent increase in temperature of the steam, so that the height of mercury will indicate the absolute pressure of the steam and its temperature corresponding to this pressure.

The water of condensation, caused by steam impinging on the conical upper part of the steam vessel $h$, trickles down into the water-space 11, and thereby keeps the water-level constant.

In order to insure that the height of mercury in the tube shall correctly indicate the absolute pressure of steam when the apparatus is in use, each time a reading of the apparatus is taken the barometric pressure should be noted and the back board $b$ so set that the hair-line 15 on the fixed strip 14 is immediately over the corresponding scale-indication of the plate 15.

A film of glycerin resting on the mercury-column in the tube $a$ by keeping the glass lubricated and preventing air acting on the mercury keeps the glass clean and renders it easy to see the height of mercury within the tube.

To facilitate accurate reading in the example of apparatus above described, a mirror 17 is provided, which is fixed at an angle of forty-five degrees to the horizontal, so as to reflect that portion of the mercury-tube $a$ and scale opposite to which it is located.

The frame of the mirror 17 is provided with tubular slides 18, adapted to slide on guide-rods 19, fixed to the guides $m$. 20 is a second mirror secured to the guide-rods 19 near their lower ends and adapted to receive rays projected from the mirror 17. The frame of this second mirror 20 is arranged to rotate about a horizontal axis 21, so that it can be turned into a convenient position for observation.

To the frame holding the mirror 17 is secured a bracket 22, supporting a gas-pipe 23, burner 24, and a reflector 25, that reflects the light from the burner 24 upon the mercury-tube, adjacent to the reading-mirror 17, but conceals it from the observation-mirror 20. The gas-pipe 23 is connected by india-rubber tubing or other flexible tubular connection 26 to a gas-main 27, and the reading-mirror 17 and connected parts are supported in position required for observation by a cord 28, that is secured at one of its ends to the mirror-frame, passes over guide-pulleys 29 and is connected at its other end to a drum 30, that is fixed to a suitable axle 31, working in brackets 32, fixed to the guides $m$ near their lower ends. The cord 28 is passed two or three times around the drum and has secured to its lower end a weight 34. The outer end of the axle is provided with a handle 33.

The water vessel $f$, which prevents the mercury becoming unduly heated by the steam, may in some cases, be omitted.

When using the apparatus for indicating temperature, care should be taken to remove all air, for although the apparatus would, notwithstanding the pressure of air, record accurately the pressure it would not then accurately indicate the actual temperature.

Apparatus according to this invention may advantageously be employed for many industrial purposes—for example, in the manufacture of vulcanized rubber to enable the heat of the vulcanizing chambers to be readily ascertained, and thereby maintained at the desired temperatures.

What I claim is—

1. In apparatus for indicating absolute pressure or temperature or both absolute pressure and temperature of saturated steam, the combination of a vessel containing mercury, an upwardly-extending transparent tube in communication at its upper end with the atmosphere and at its lower end with the mercury-containing vessel, a part adapted to indicate the height of mercury in the tube when both ends of the apparatus are open to the atmosphere, a suitably-calibrated scale against which said mercury-tube is supported, said scale being adjustable relatively to the mercury-tube and said indicating part and means for causing the steam to act on the mercury in said mercury-containing vessel.

2. In apparatus for indicating absolute pressure or temperature or both absolute pressure and temperature of saturated steam the combination of a vessel containing mercury, an upwardly-extending transparent tube that is open at its upper end to the atmosphere and at its lower end is in communication with the mercury-containing vessel, a part adapted to indicate the normal height of mercury in said tube, a suitably-calibrated scale against which said tube is supported, means for adjusting said scale in relation to said tube and to said normal level-indicating part, a water-containing vessel, a passage between the bottom of said water vessel and the top of said mercury vessel, means for supplying mercury to said mercury vessel, means for withdrawing mercury therefrom, means for allowing air to escape from said mercury vessel and said water vessel and means for causing steam to act on the mercury in said mercury vessel, substantially as described.

3. In apparatus for indicating pressure or temperature or both pressure and temperature of saturated steam the combination of a vessel containing mercury, an upwardly-extending transparent tube that is open at its upper end to the atmosphere and at its lower end is in communication with the mercury-containing vessel, a suitably-calibrated scale against which said tube is supported, a water-containing vessel, a water and steam vessel, a passage between the bottom of said water vessel and the top of said mercury vessel, a passage between the top of said water vessel and the bottom of said steam and water vessel, means for supplying mercury to said mercury vessel, means for withdrawing mercury therefrom, means for allowing air to escape from all said vessels, means for maintaining a constant water-level in said water and steam vessel and means for admitting steam to the upper part of said water and steam vessel so as to act on the water therein, substantially as described.

4. In apparatus for indicating absolute pressure or temperature or both pressure and temperature of saturated steam the combination of a vessel bored cylindrically for a portion thereof and containing mercury, an upwardly-extending transparent tube that is open at its upper end to the atmosphere and at its lower end is in communication with the mercury-containing vessel, a suitably-calibrated scale against which said tube is supported, a water and steam vessel formed with a conical or cone-shaped top and provided at its bottom with an adjustable tubular extension forming between it and the surrounding wall of the vessel an annular space containing water, an upwardly-inclined passage between the bottom of said annular space and the top of said mercury vessel means for supplying mercury to said mercury vessel, means for withdrawing mercury therefrom, means for allowing air to escape from all said vessels and means for admitting steam to the upper part of said water and steam vessel substantially as described.

5. In apparatus for indicating absolute pressure or temperature or both pressure and temperature of saturated steam the combination of a vessel bored cylindrically for a portion thereof and containing mercury, an upwardly-extending transparent tube that is open at its upper end to the atmosphere and at its lower end is in communication with the mercury-containing vessel, a suitably-calibrated scale against which said tube is supported a water-containing vessel, a passage between the bottom of said water vessel and top of said mercury vessel, a water and steam vessel formed with a conical or cone-shaped top and provided at its bottom with an adjustable tubular extension forming between it and the surrounding wall of the vessel an annular space containing water, an upwardly-inclined passage between the bottom of said annular space and the top of said mercury vessel, means for supplying mercury to said mercury vessel, means for withdrawing mercury therefrom, means for allowing air to escape from all said vessels and means for admitting steam to the upper part of said water and steam vessel, substantially as described.

6. In apparatus for indicating absolute pressure or temperature or absolute pressure and temperature of saturated steam, the combination of a vessel containing mercury, an upwardly-extending transparent tube in communication at its upper end with the atmosphere and at its lower end with the mercury-containing vessel, a part adapted to indicate the height of mercury in the tube when both ends of the apparatus are open to the atmosphere, a suitably-calibrated scale against which said mercury-tube is supported, vertical guides in which said scale is adapted to slide, means whereby said scale can be moved up or down said guides relatively to said tube and indicating part, and means for causing steam to act on the mercury in the containing vessel.

7. In apparatus for indicating pressure or temperature or both pressure and temperature of saturated steam the combination of a vessel containing mercury, an upwardly-extending transparent tube that is open at its upper end to the atmosphere and at its lower end is in communication with the mercury-containing vessel, a suitably-calibrated scale against which said tube is supported vertical guides in which said scale is adapted to slide, a screwed nut fixed to said scale, a vertical screwed spindle working through said nut, a worm-wheel on said spindle, a horizontal spindle, a worm on said horizontal spindle gearing with said worm-wheel, an operating hand-wheel fixed to one end of said horizontal spindle, and means for causing steam to act on the mercury in the containing vessel, substantially as described.

8. In apparatus for indicating absolute pressure or temperature or absolute pressure and temperature of saturated steam, the combination of a vessel containing mercury, an upwardly-extending transparent tube in communication at its upper end with the atmosphere and at its lower end with the mercury-containing vessel, a part adapted to indicate the height of mercury in the tube when both ends of the apparatus are open to the atmosphere, a suitably-calibrated scale against which said mercury-tube is supported, means whereby said scale can be moved up or down relatively to said tube and indicating part, means for causing steam to act on the mercury in said vessel, and means whereby the readings of the apparatus are reflected conveniently for observation.

9. In apparatus for indicating absolute pressure or temperature or absolute pressure and temperature of saturated steam, the combination of a vessel containing mercury, an upwardly-extending transparent tube in communication at its upper end with the atmosphere and at its lower end with the mercury-containing vessel, vertical guides supporting said tube, a part fixed to said guides and adapted to indicate the height of mercury in the tube when both ends of the apparatus are open to the atmosphere, a suitably-calibrated scale against which said mercury-tube is supported, and which scale is adapted to slide in said vertical guides, means whereby said scale can be moved up or down said guides relatively to said tube and indicating part, and means for causing steam to act on the mercury in the containing vessel.

10. In apparatus for indicating pressure or temperature or both pressure and temperature of saturated steam the combination of a vessel containing mercury, an upwardly-extending transparent tube that is open at its upper end to the atmosphere and at its lower end is in communication with the mercury-containing vessel, a suitably-calibrated scale against which said tube is supported means for causing steam to act on the mercury in the containing vessel, a reading-mirror fixed at an angle of forty-five degrees to the horizontal, guides parallel to said tube, on which said mirror is mounted, an observation-mirror arranged to receive the rays projected from the reading-mirror means for adjusting said reading-mirror on said guides substantially as described.

11. In apparatus for indicating pressure or temperature or both pressure and temperature of saturated steam the combination of a vessel containing mercury, an upwardly-extending transparent tube that is open at its upper end to the atmosphere and at its lower end is in communication with the mercury-containing vessel, a suitably-calibrated scale against which said tube is supported, means for causing steam to act on the mercury in the containing vessel, a reading-mirror, a holding-frame arranged at an angle of forty-five degrees to the horizon and in which said reading-mirror is fixed, guides parallel to said tube and on which said frame is mounted, an illuminating device carried by said frame, a reflector also carried by said frame, an observation-mirror arranged to receive the rays projected from the reading-mirror and means for adjusting said reading-mirror on said guides substantially as described.

12. In apparatus for indicating pressure or temperature or both pressure and temperature of saturated steam the combination of a vessel containing mercury, an upwardly-extending transparent tube that is open at its upper end to the atmosphere and at its lower end is in communication with the mercury-containing vessel, a suitably-calibrated scale against which said tube is supported, means for causing steam to act on the mercury in the containing vessel, a reading-mirror, a holding-frame arranged at an angle of forty-five degrees to the horizon and in which said reading-mirror is fixed, guides parallel to said tube and on which said frame is mounted, an illuminating device carried by said frame, a reflector also carried by said frame, an observation-mirror arranged to receive the rays projected from the reading-mirror means for adjusting said reading-mirror on said guides, a holding-frame in which said observation-mirror is mounted, and a horizontal axle on which said holding-frame is mounted, substantially as described.

13. In apparatus for indicating pressure or temperature or both pressure and temperature of saturated steam the combination of a vessel containing mercury, an upwardly-extending transparent tube that is open at its upper end to the atmosphere and at its lower end is in communication with the mercury-containing vessel, a suitably-calibrated scale against which said tube is supported, means for causing steam to act on the mercury in the containing vessel, a reading-mirror fixed at an angle of forty-five degrees to the horizontal, guides, parallel to said tube, on which said mirror is mounted, an observation-mirror arranged to receive the rays projected from the reading-mirror, a cord supporting said reading-mirror on said guides, guide-pulleys over which said cord is passed, a cord-drum around which said cord is wound, an axle to which said drum is secured, and a handle fixed to one end of said axle, substantially as described.

14. In apparatus for indicating pressure or temperature or both pressure and temperature of saturated steam the combination of a vessel containing mercury, an upwardly-extending transparent tube that is open at its upper end to the atmosphere and at its lower end is in communication with the mercury-containing vessel, a suitably-calibrated scale against which said tube is supported, means for causing steam to act on the mercury in the containing vessel, a reading-mirror, a holding-frame arranged at an angle of forty-five degrees to the horizon and in which said reading-mirror is fixed, guides parallel to said tube and on which said frame is mounted, an illuminating device carried by said frame, a reflector also carried by said frame, a cord supporting said mirror-frame on said guides, guide-pulleys over which said cord is passed, a cord-drum around which said cord is wound, an axle to which said drum is secured, an observation-mirror arranged to receive the rays projected from the reading-mirror, means for adjusting said reading-mirror on said guides, a holding-frame in which said observation-mirror is mounted, and a horizontal axle on which said holding-frame is mounted, substantially as described.

15. In apparatus for indicating absolute pressure or temperature or absolute pressure and temperature of saturated steam, the combination of a vessel containing mercury, an upwardly-extending transparent tube in communication at its upper end with the atmosphere and at its lower end with the mercury-containing vessel, vertical guides supporting said tube, a part fixed to said guides and comprising a glass plate provided with a hair-line and adapted to indicate the height of the mercury in the tube when both ends of the apparatus are open to the atmosphere, a suitably-calibrated scale adapted to slide in said guides, means whereby said scale can be moved up or down said guides relatively to said tube and indicating part, and means for causing steam to act on the mercury in the containing vessel.

16. In apparatus for indicating absolute pressure or temperature or both pressure and temperature of saturated steam the combination of a vessel, bored cylindrically for a portion thereof and containing mercury an upwardly-extending transparent tube that is open at its upper end to the atmosphere and at its lower end is in communication with the mercury-containing vessel, a layer of glycerin located on said mercury in said tube, a suitably-calibrated scale against which said tube is supported, a water-containing vessel, a passage between the bottom of said water vessel and top of said mercury vessel, a water and steam vessel formed with a conical or cone-shaped top and provided at its bottom with an adjustable tubular extension forming between it and the surrounding wall of the vessel an annular space containing water, an upwardly-inclined passage between the bottom of said annular space and the top of said water vessel, substantially as described.

17. In apparatus for indicating absolute pressure or temperature or both pressure and temperature of saturated steam the combination of a vessel, bored cylindrically for a portion thereof and containing mercury an upwardly-extending transparent tube that is open at its upper end to the atmosphere and at its lower end is in communication with the mercury-containing vessel, a water and steam vessel formed with a conical or cone-shaped top and provided at it bottom with an adjustable tubular extension forming between it and the surrounding wall of the vessel an annular space containing water, an upwardly-inclined passage between the bottom of said annular space and the top of said mercury vessel.

Signed at 77 Cannon street, in the city of London, England, this 8th day of April, 1903.

RICHARD THOMSON GLASCODINE.

Witnesses:
WILLIAM HENRY SIMMS,
CECIL READE QUARTLEY.